US008775379B2

(12) United States Patent
Reed et al.

(10) Patent No.: US 8,775,379 B2
(45) Date of Patent: Jul. 8, 2014

(54) ENSURING PARTITIONED DATASET EXTENDED (PDSE) CRITICAL DATASET REDUNDANCY (CDR)

(75) Inventors: David C. Reed, Tucson, AZ (US);
Thomas C. Reed, Tucson, AZ (US);
Max D. Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 166 days.

(21) Appl. No.: 13/358,443

(22) Filed: Jan. 25, 2012

(65) Prior Publication Data
US 2013/0191343 A1 Jul. 25, 2013

(51) Int. Cl.
*G06F 17/30* (2006.01)
(52) U.S. Cl.
USPC ............................ 707/654; 707/674; 707/678
(58) Field of Classification Search
USPC .......................................... 707/654, 674, 678
See application file for complete search history.

(56) References Cited

U.S. PATENT DOCUMENTS

| 5,177,744 | A | 1/1993 | Cesare et al. | |
|---|---|---|---|---|
| 7,730,213 | B2 | 6/2010 | Howard | |
| 7,814,057 | B2 | 10/2010 | Kathuria et al. | |
| 8,285,756 | B2 * | 10/2012 | Nimura et al. | 707/805 |
| 2002/0078244 | A1 | 6/2002 | Howard | |
| 2005/0071721 | A1 | 3/2005 | Butt et al. | |
| 2006/0224636 | A1 | 10/2006 | Kathuria et al. | |
| 2009/0125753 | A1 | 5/2009 | Kryka | |
| 2013/0191344 | A1 | 7/2013 | Reed | |

OTHER PUBLICATIONS

West, "Error Detection and Correction for Storage Members to Correct Long and Short Error Bursts," IBM Corporation, IPCOM000037173D, Nov. 1, 1989,TDB, pp. 387-389.
"What is a PDSE?," IBM Corporation 1990, 2010, http://publib.boulder.ibm.com/infocenter/zos/basics/topic/com.ibm.zos.zconcepts/zconcepts_166.htm, 1 page.
Lamb, "Storage Device Error Detection and Fault/FRU Isolation via Concurrent Longitudinal Redundancy Codes Checking," IBM Corporation, IPCOM000118820D, Jul. 1, 1997, TDB, vol. 40, No. 7, pp. 145-148.
"z/OS Basic Skills Information Center: z/OS concepts," 2006, 2010 IBM Corporation, 118 pages.
Non-Final Office Action from U.S. Appl. No. 13/764,641 dated May 9, 2013.
Notice of Allowance and Fee(s) Due from U.S. Appl. No. 13/76,464 dated Oct. 15, 2013.

* cited by examiner

*Primary Examiner* — Baoquoc N To
(74) *Attorney, Agent, or Firm* — Zilka-Kotab, PC

(57) ABSTRACT

In one embodiment, a system includes a critical partitioned dataset extended (PDSE) stored to memory of the system; logic adapted for protecting the critical PDSE by creating a copy of the critical PDSE, referred to as a PDSE copy; logic adapted for providing a critical dataset redundancy (CDR) task with exclusive access to the PDSE copy; logic adapted for providing a replacement critical PDSE by redirecting corralled connections to the PDSE copy; logic adapted for protecting the replacement critical PDSE by creating a copy of the replacement critical PDSE, referred to as a replacement PDSE copy; and logic adapted for providing the CDR task with exclusive access to the replacement PDSE copy.

15 Claims, 9 Drawing Sheets

ENSURING PARTITIONED DATASET EXTENDED (PDSE) CRITICAL DATASET REDUNDANCY (CDR)

BACKGROUND

The present invention relates to partitioned dataset extended (PDSE) critical dataset redundancy (CDR), and more specifically, this invention relates to systems for recovering from both in-core and on-media corruption with minimal interruption to operations.

Currently, PDSE processing is split between two address spaces, SMSPDSE which handles global PDSE connections, and SMSPDSE1 which handles local PDSE connections. Although SMSPDSE1 is able to be restarted in order to recover from errors and/or corruption to datasets, SMSPDSE is not because of multiple virtual storage (MVS) restrictions. Therefore, a globally connected PDSE currently cannot recover from corruption or damage without a system initial program load (IPL).

When a globally connected PDSE becomes corrupted, especially a critical dataset such as one in LINKLIB or a STEPLIB, critical jobs can fail leading quickly to the need for an emergency IPL. An emergency IPL causes a system outage and can result in millions of dollars in expenses and missed service level agreements, which clients typically look to be reimbursed for. While significant code improvements have been made over the life of PDSE, index-breaking errors are still prevalent and reducing or eliminating these errors would greatly benefit the use of PDSE.

BRIEF SUMMARY

In one embodiment, a system includes a critical partitioned dataset extended (PDSE) stored to memory of the system, logic adapted for protecting the critical PDSE by creating a copy of the critical PDSE, referred to as a PDSE copy, logic adapted for providing a critical dataset redundancy (CDR) task with exclusive access to the PDSE copy, logic adapted for initiating a transaction queue for tracking updates to the critical PDSE, logic adapted for adding any updates performed to the critical PDSE to the transaction queue, logic adapted for updating the PDSE copy according to the transaction queue, logic adapted for quiescing the critical PDSE, logic adapted for corralling a plurality of open connections to the critical PDSE in response to the quiescing, logic adapted for completing each of one or more updates resident in the transaction queue to bring the PDSE copy up to a last known uncorrupted state of the critical PDSE, logic adapted for providing a replacement critical PDSE by redirecting the corralled connections to the PDSE copy, logic adapted for protecting the replacement critical PDSE by creating a copy of the replacement critical PDSE, referred to as a replacement PDSE copy, and logic adapted for providing the CDR task with exclusive access to the replacement PDSE copy.

In another embodiment, a computer program product for providing recoverability to a system includes a computer readable storage medium having computer readable program code embodied therewith, the computer readable program code including: computer readable program code configured for protecting a critical PDSE by creating a copy of the critical PDSE, referred to as a PDSE copy; computer readable program code configured for providing a CDR task with exclusive access to the PDSE copy; computer readable program code configured for initiating a transaction queue for tracking updates to the critical PDSE; computer readable program code configured for adding any updates performed to the critical PDSE to the transaction queue; computer readable program code configured for updating the PDSE copy according to the transaction queue; computer readable program code configured for quiescing the critical PDSE; computer readable program code configured for corralling a plurality of open connections to the critical PDSE in response to the quiescing; computer readable program code configured for completing each of one or more updates resident in the transaction queue to bring the PDSE copy up to a last known uncorrupted state of the critical PDSE; computer readable program code configured for providing a replacement critical PDSE by redirecting the corralled connections to the PDSE copy; computer readable program code configured for protecting the replacement critical PDSE by creating a copy of the replacement critical PDSE, referred to as a replacement PDSE copy; and computer readable program code configured for providing the CDR task with exclusive access to the replacement PDSE copy.

According to yet another embodiment, a computer program product for providing recoverability to a system includes a computer readable storage medium having computer readable program code embodied therewith, the computer readable program code including: computer readable program code configured for protecting a critical PDSE by creating a copy of the critical PDSE, referred to as a PDSE copy, wherein the PDSE copy is a logical equivalent of the critical PDSE; computer readable program code configured for providing a CDR task with exclusive access to the PDSE copy; computer readable program code configured for flagging the PDSE copy to indicate that it is a dataset copy and is accessible only by the CDR task; computer readable program code configured for initiating a transaction queue for tracking updates to the critical PDSE; computer readable program code configured for adding any updates performed to the critical PDSE to the transaction queue; computer readable program code configured for updating the PDSE copy according to the transaction queue; computer readable program code configured for quiescing the critical PDSE; computer readable program code configured for corralling a plurality of open connections to the critical PDSE in response to the quiescing; computer readable program code configured for completing each of one or more updates resident in the transaction queue to bring the PDSE copy up to a last known uncorrupted state of the critical PDSE; computer readable program code configured for providing a replacement critical PDSE by redirecting the corralled connections to the PDSE copy; computer readable program code configured for removing the flag from the PDSE copy after providing the replacement critical PDSE; computer readable program code configured for protecting the replacement critical PDSE by creating a copy of the replacement critical PDSE, referred to as a replacement PDSE copy; computer readable program code configured for providing the CDR task with exclusive access to the replacement PDSE copy; and computer readable program code configured for flagging the replacement PDSE copy to indicate that it is a dataset copy and is accessible only by the CDR task.

Other aspects and embodiments of the present invention will become apparent from the following detailed description, which, when taken in conjunction with the drawings, illustrate by way of example the principles of the invention.

DETAILED DESCRIPTION

Figure 1:
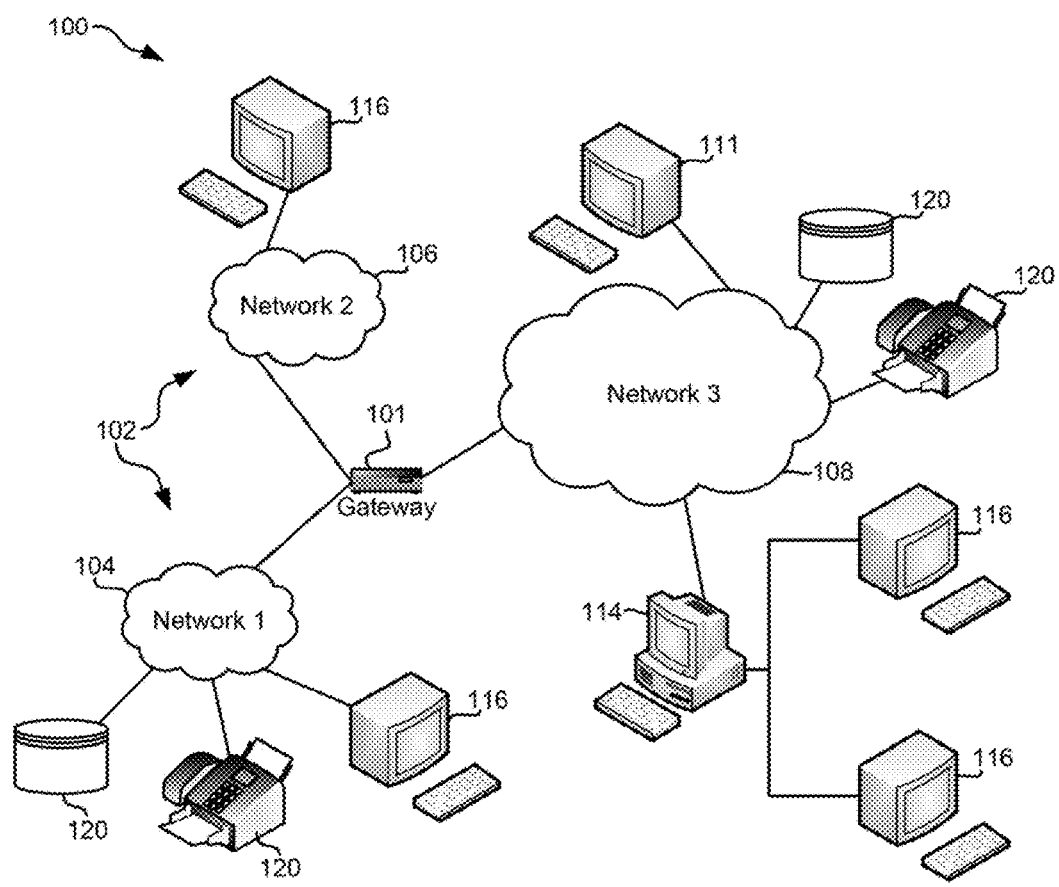
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for partitioned dataset extended (PDSE) critical dataset redundancy (CDR) which provides the ability to recover from both in-core and on-disk corruption with minimal interruption to operations.

In one general embodiment, a system includes a critical PDSE stored to memory of the system, logic adapted for protecting the critical PDSE by creating a copy of the critical PDSE, referred to as a PDSE copy, logic adapted for providing a CDR task with exclusive access to the PDSE copy, logic adapted for initiating a transaction queue for tracking updates to the critical PDSE, logic adapted for adding any updates performed to the critical PDSE to the transaction queue, logic adapted for updating the PDSE copy according to the transaction queue, logic adapted for quiescing the critical PDSE, logic adapted for corralling a plurality of open connections to the critical PDSE in response to the quiescing, logic adapted for completing each of one or more updates resident in the transaction queue to bring the PDSE copy up to a last known uncorrupted state of the critical PDSE, logic adapted for providing a replacement critical PDSE by redirecting the corralled connections to the PDSE copy, logic adapted for protecting the replacement critical PDSE by creating a copy of the replacement critical PDSE, referred to as a replacement PDSE copy, and logic adapted for providing the CDR task with exclusive access to the replacement PDSE copy.

In another general embodiment, a computer program product for providing recoverability to a system includes a computer readable storage medium having computer readable program code embodied therewith, the computer readable program code including: computer readable program code configured for protecting a critical PDSE by creating a copy of the critical PDSE, referred to as a PDSE copy; computer readable program code configured for providing a CDR task with exclusive access to the PDSE copy; computer readable program code configured for initiating a transaction queue for tracking updates to the critical PDSE; computer readable program code configured for adding any updates performed to the critical PDSE to the transaction queue; computer readable program code configured for updating the PDSE copy according to the transaction queue; computer readable program code configured for quiescing the critical PDSE; computer readable program code configured for corralling a plurality of open connections to the critical PDSE in response to the quiescing; computer readable program code configured for completing each of one or more updates resident in the transaction queue to bring the PDSE copy up to a last known uncorrupted state of the critical PDSE; computer readable program code configured for providing a replacement critical PDSE by redirecting the corralled connections to the PDSE copy; computer readable program code configured for protecting the replacement critical PDSE by creating a copy of the replacement critical PDSE, referred to as a replacement PDSE copy; and computer readable program code configured for providing the CDR task with exclusive access to the replacement PDSE copy.

In another general embodiment, a method for providing recoverability to a system includes protecting a critical PDSE by creating a copy of the critical PDSE, referred to as a PDSE copy, providing a CDR task with exclusive access to the PDSE copy, initiating a transaction queue for tracking updates to the critical PDSE, adding any updates performed to the critical PDSE to the transaction queue, updating the PDSE copy according to the transaction queue, quiescing the critical PDSE, corralling a plurality of open connections to the critical PDSE in response to the quiescing, completing each of one or more updates resident in the transaction queue to bring the PDSE copy up to a last known uncorrupted state of the critical PDSE, providing a replacement critical PDSE by redirecting the corralled connections to the PDSE copy, protecting the replacement critical PDSE by creating a copy of the replacement critical PDSE, referred to as a replacement PDSE copy, and providing the CDR task with exclusive access to the replacement PDSE copy.

According to yet another general embodiment, a computer program product for providing recoverability to a system includes a computer readable storage medium having computer readable program code embodied therewith, the computer readable program code including: computer readable program code configured for protecting a critical PDSE by creating a copy of the critical PDSE, referred to as a PDSE copy, wherein the PDSE copy is a logical equivalent of the critical PDSE; computer readable program code configured for providing a CDR task with exclusive access to the PDSE copy; computer readable program code configured for flagging the PDSE copy to indicate that it is a dataset copy and is accessible only by the CDR task; computer readable program code configured for initiating a transaction queue for tracking updates to the critical PDSE; computer readable program code configured for adding any updates performed to the critical PDSE to the transaction queue; computer readable program code configured for updating the PDSE copy according to the transaction queue; computer readable program code configured for quiescing the critical PDSE; computer readable program code configured for corralling a plurality of open connections to the critical PDSE in response to the quiescing; computer readable program code configured for completing each of one or more updates resident in the transaction queue to bring the PDSE copy up to a last known uncorrupted state of the critical PDSE; computer readable program code configured for providing a replacement critical PDSE by redirecting the corralled connections to the PDSE copy; computer readable program code configured for removing the flag from the PDSE copy after providing the replacement critical PDSE; computer readable program code configured for protecting the replacement critical PDSE by creating a copy of the replacement critical PDSE, referred to as a replacement PDSE copy; computer readable program code configured for providing the CDR task with exclusive access to the replacement PDSE copy; and computer readable program code configured for flagging the replacement PDSE copy to indicate that it is a dataset copy and is accessible only by the CDR task.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic", a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), digital versatile disc read-only memory (DVD-ROM), a BLU-RAY disc, an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, PSTN, internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
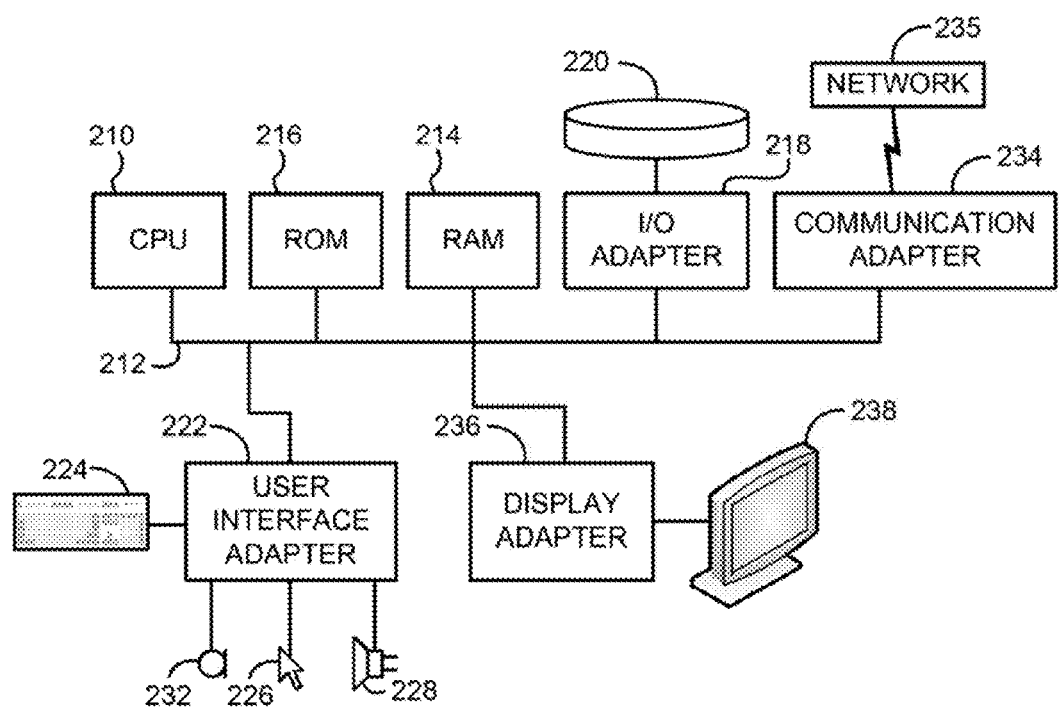
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as a MICROSOFT WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language or other programming languages, along with an object oriented programming methodology. Object oriented programming (OOP), which has become increasingly used to develop complex applications, may be used.

Figure 3:
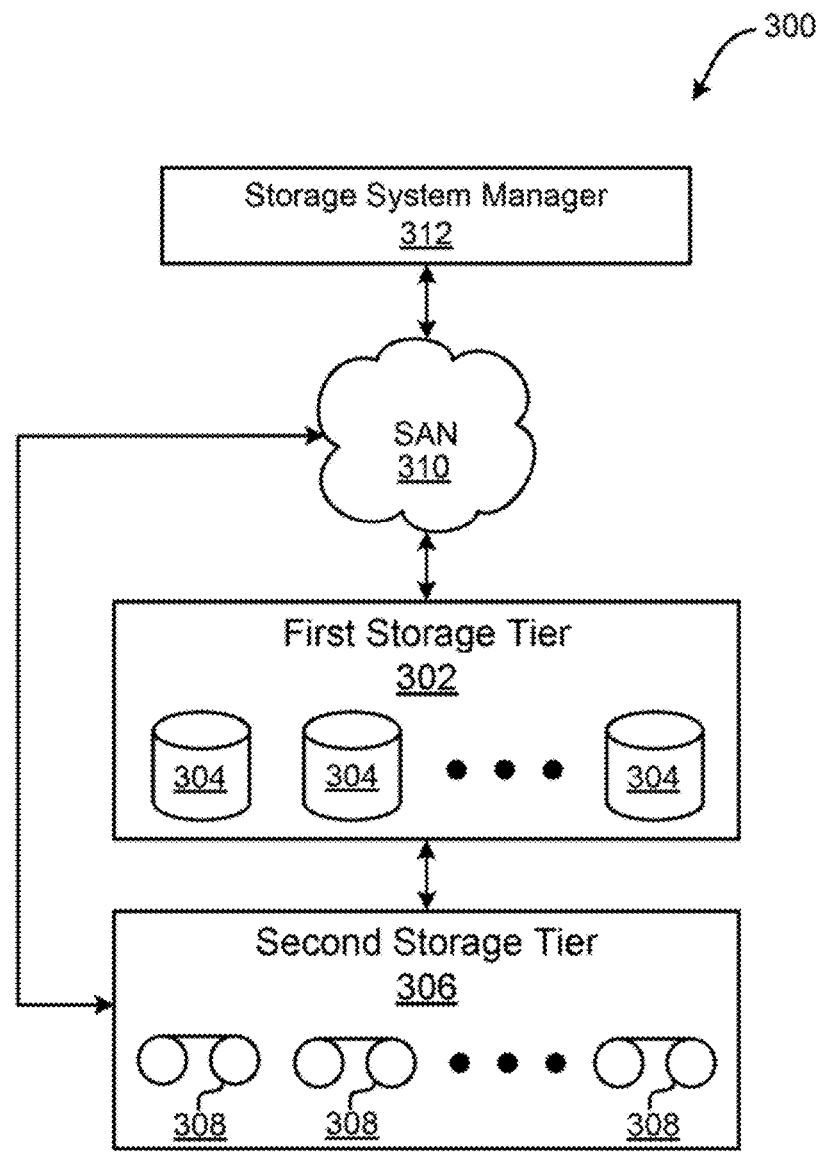
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on a higher storage tier 302 and a lower storage tier 306. The higher storage tier 302 preferably may include one or more random access and/or direct access media 304, such as hard disks in hard disk drives (HDDs), nonvolatile memory (NVM), solid state memory in solid state drives (SSDs), etc., and/or others noted herein. The lower storage tier 306 may preferably include one or more sequential access media 308, such as magnetic tape in tape drives, optical media, etc., and/or others noted herein. Additional storage tiers 316 may include any combination of storage memory media. The storage system manager 312 may communicate with the storage media 304, 308 on the higher and lower storage tiers 302, 306 through a network 310, such as a storage area network (SAN), as shown in FIG. 3. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of direct access storage device (DASD) having storage memory media therein, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic adapted to receive a request to open a data set, logic adapted to determine if the requested data set is stored to a lower storage tier 306 of a tiered data storage system 300 in multiple associated portions, logic adapted to move each associated portion of the requested data set to a higher storage tier 302 of the tiered data storage system 300, and logic adapted to assemble the requested data set on the higher storage tier 302 of the tiered data storage system 300 from the associated portions.

While PDSE datasets are extensively serialized and care is taken to ensure data serialization and integrity, there remain at least two types of potential corruption. One type is in-core corruption, in which the in-memory index becomes damaged but leaves the PDSE stored on a DASD intact. Historically, in-core corruption generally results from PDSE code defects, combined with extreme processing loads, which tend to expose timing window errors, recovery errors, and other non-mainline code issues. While significant code improvements have been made over the life of PDSE, it has heretofore been impossible to guarantee that no further index-breaking errors exist.

A second type of corruption is where the PDSE corruption exists in the DASD copy of the dataset, known as on-DASD corruption. This sort of corruption is almost exclusively due to user error and improper sharing of the PDSE dataset. Generally, this involves a SYSPLEX running PDSE Sharing Extended which serializes at the SYSPLEX level mediated by a cross coupling facility (XCF). If DASD is made on-line to a system outside of the SYSPLEX, thus XCF, both the SYSPLEX and the outside system may access the PDSE simultaneously in an unserialized manner. If such unserialized access occurs, the dataset may easily become unusable and there is a potential for data loss. A typical PDSE support center may field anywhere from two to four occurrences of corruption, on average per week, including both in-core and on-DASD corruption with widely varying levels of customer impact.

However, PDSE CDR provides an ability to recover from in-core and/or on-DASD corruption with minimal interruption to operations, according to various embodiments. CDR may be provided by a single CDR task for each dataset for which redundancy is being provided in one approach. Each CDR task may be enqueued exclusively on a copy of the dataset for which redundancy is being provided and may be the sole updater of the copy dataset according to this approach. When corruption is detected to a dataset for which redundancy is being provided, the original dataset may be quiesced and all I/O may be held while all connections are redirected to the CDR copy of the dataset. By quiesced, what is meant is that the dataset is frozen such that no more data is input or output from the dataset, and it becomes static. Finally, in one approach, a new CDR copy of the dataset may be created and associated with its CDR task allowing the dataset to continue being protected.

Figure 4A:
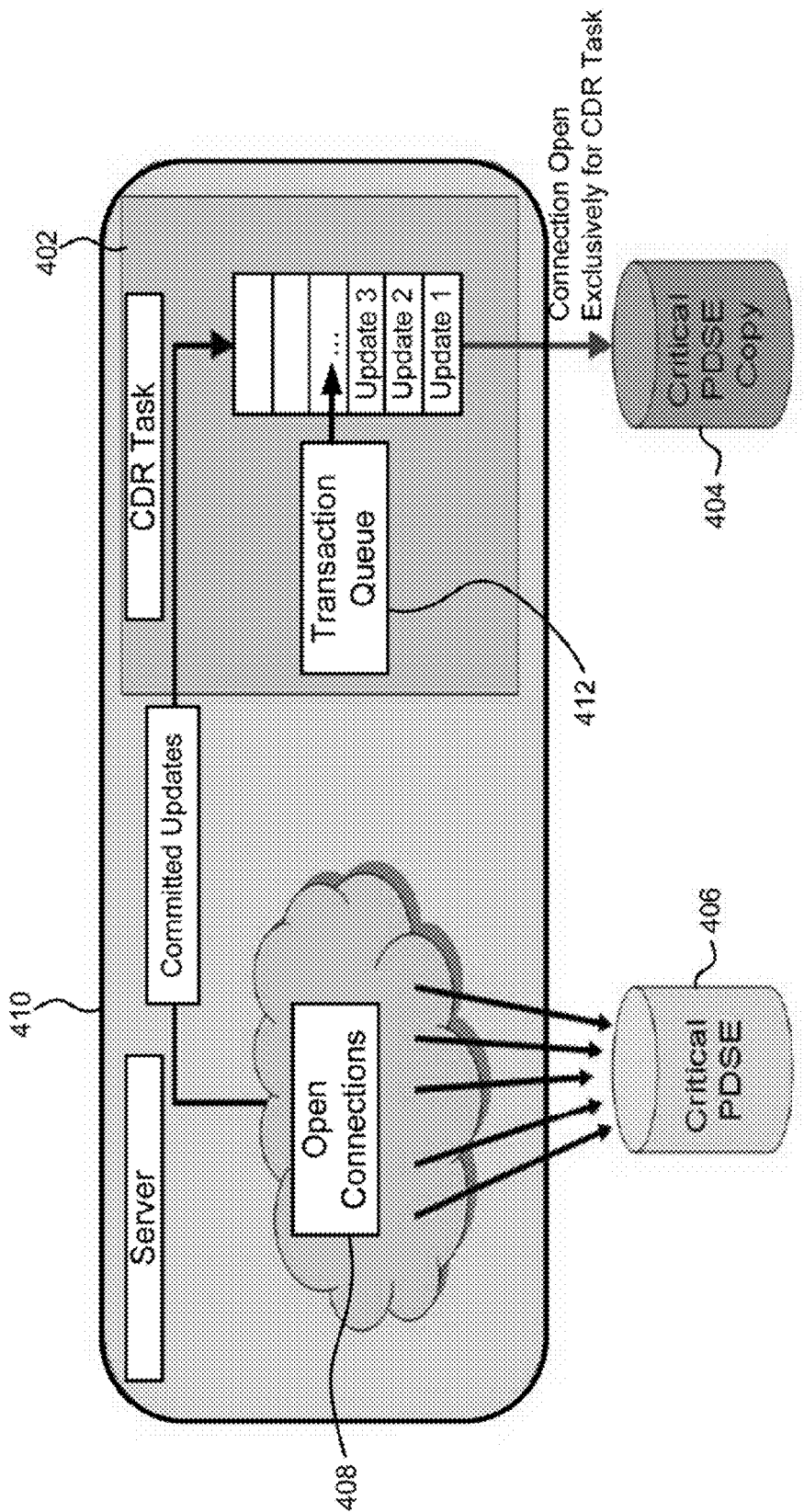
FIG. 4A shows a normal state of operations for a CDR protected dataset, according to one embodiment.

As shown in FIG. 4A, according to one embodiment, the ability of CDR to provide recoverability may be provided by using two paired components, a CDR task 402 and a copy of the dataset being protected 404. The critical PDSE 406 remains accessible through open connections 408 on the server 410, such as in server address space SMSPDSE according to one approach, which is server address space which manages connections and requests for PDSE datasets. The CDR task(s) exist within the SMSPDSE address space, according to preferred embodiments. The protected dataset copy 404 remains a normal PDSE dataset with no changes except for a flag or other indictor being set, which designates that the PDSE may only be used by a CDR task 402.

It should be noted that the protected copy 404 of the PDSE is defined as a logically equivalent copy rather than being a physically identical copy of the protected critical PDSE dataset 406. The CDR task 402 holds exclusive access to the protected dataset copy 404 and controls all updates to the dataset copy 404.

In order for the CDR to keep the protected copy 404 of the PDSE up to date with the parent dataset (the critical PDSE 406), the CDR may maintain a transaction queue 412 or some other repository which may include update information. The transaction queue 412, according to one embodiment, may be a First-In First-Out (FIFO) queue with transactions being added to the queue only after the transaction successfully completes on the parent dataset 406. Of course, other schemes may be used, such as last-in first-out, highest priority being serviced first, etc., as would be understood by one of skill in the art. Updates on the transaction queue 412 may then be processed one at a time. Updates to the parent dataset 406 may be communicated to the CDR transaction queue 412 by the PDSE server task, according to one embodiment. Of course, any suitable logic, method, and/or apparatus may be used to communicate the updates as would be understood by one of skill in the art upon reading the present descriptions.

Figure 4B:
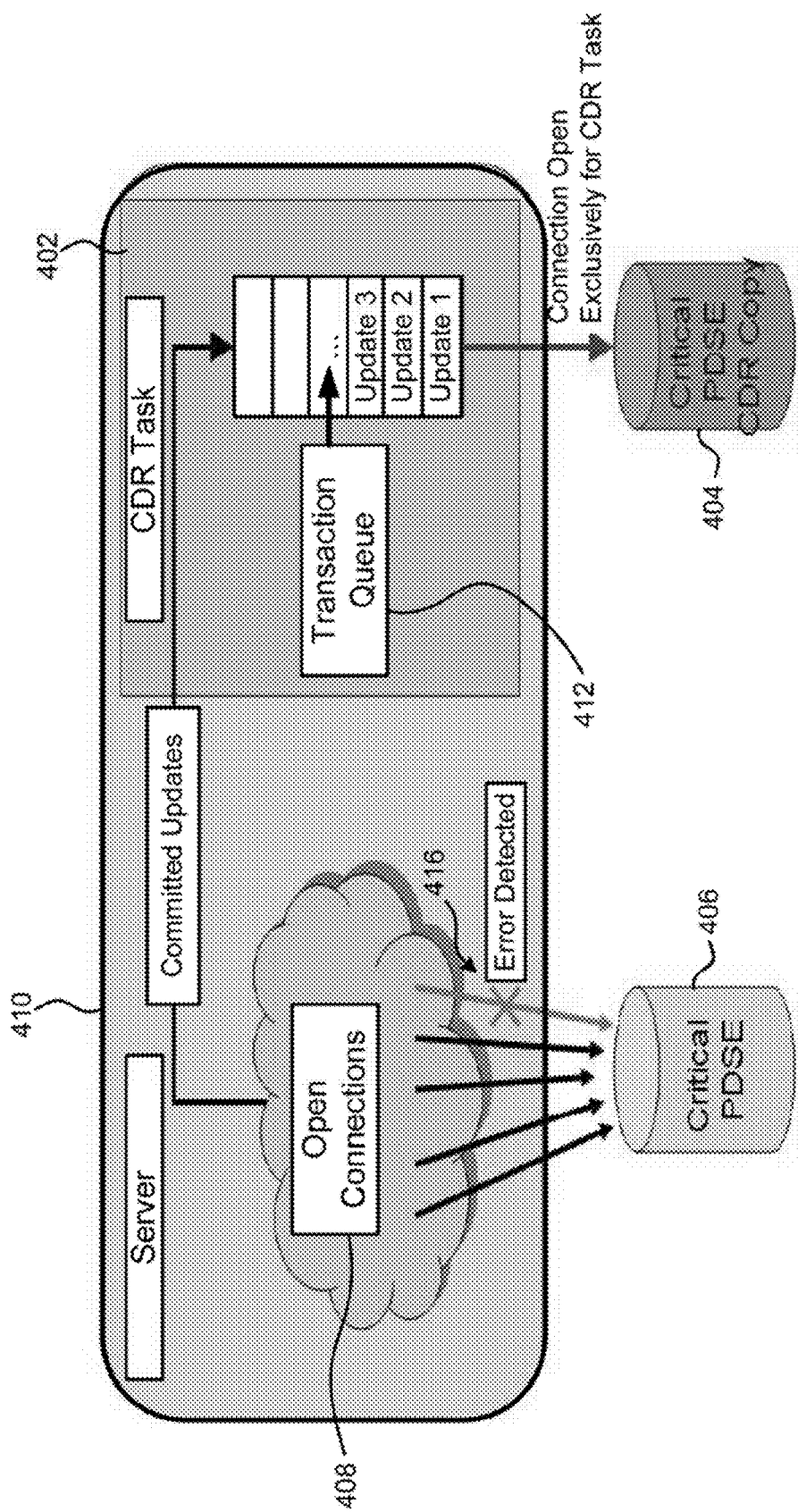
FIG. 4B shows an operation in protecting a CDR protected dataset, according to one embodiment.

Now referring to FIG. 4B, a first step of a recovery process is shown when corruption is first detected for a protected dataset 406. The server 410 detects the error 416 which may be thrown, for example, as a "0F4 ABEND" in one illustrative approach. Any type of errors known in the art may be detected. The specific error(s) detected may relate to corruption of the PDSE directory, either in memory, on DASD, etc.

Figure 4C:
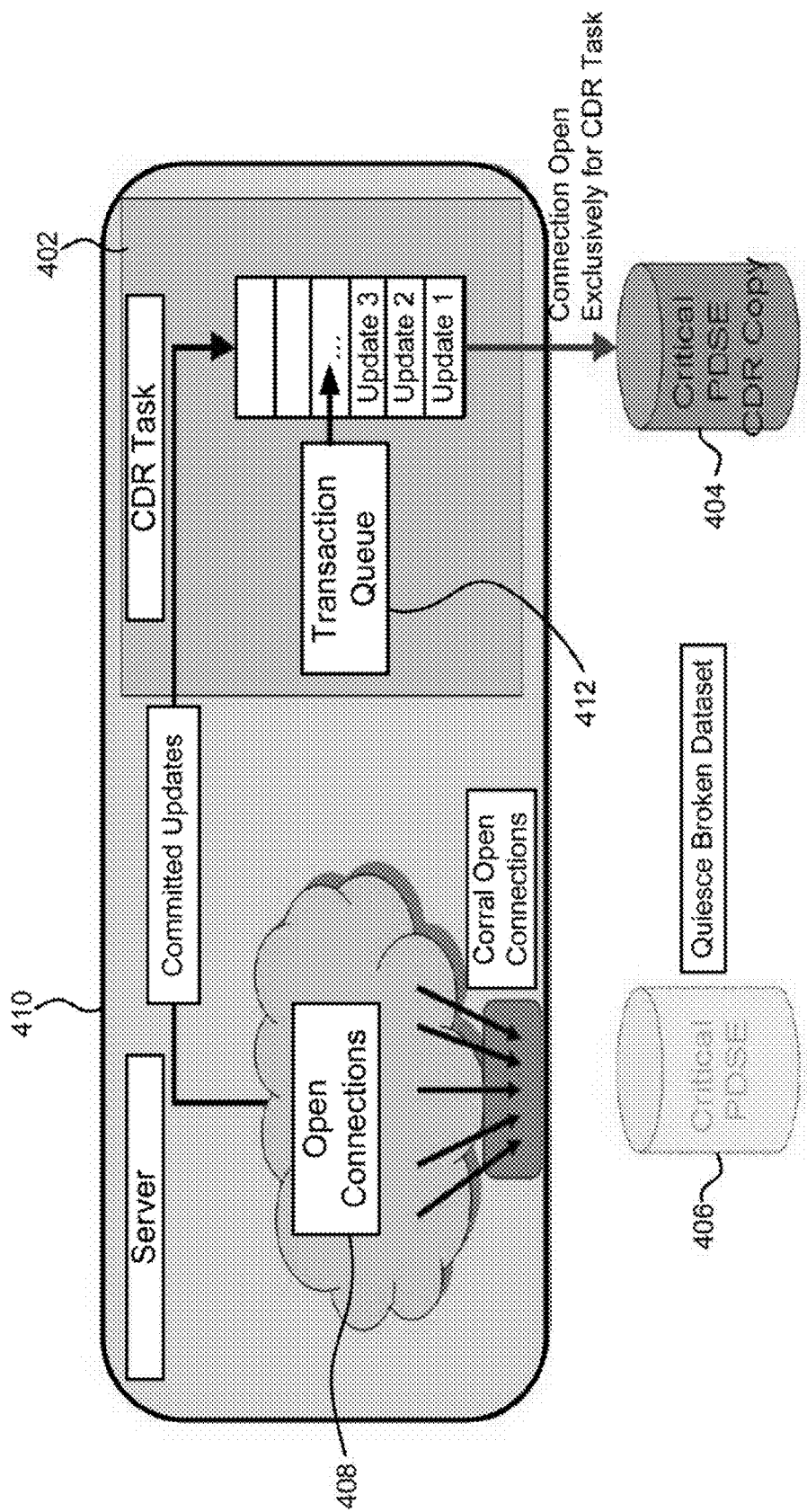
FIG. 4C shows an operation in protecting a CDR protected dataset, according to one embodiment.

In the event that corruption is detected in the parent protected dataset 406 due to an error 416, the parent protected dataset 406 may be immediately quiesced, as shown in FIG. 4C, according to one embodiment. FIG. 4C shows the broken dataset 406 being quiesced and the open connections 408 to the dataset 406 being corralled to prevent further errors. Updates to the dataset 406 in the transaction queue 412, if any, continue to be processed bringing the CDR copy 404 of the dataset up to date. The open connections 408 may be corralled in order to ensure that any further updates are transmitted to the transaction queue 412 and not to the possibly corrupt critical PDSE dataset 406.

Figure 4D:
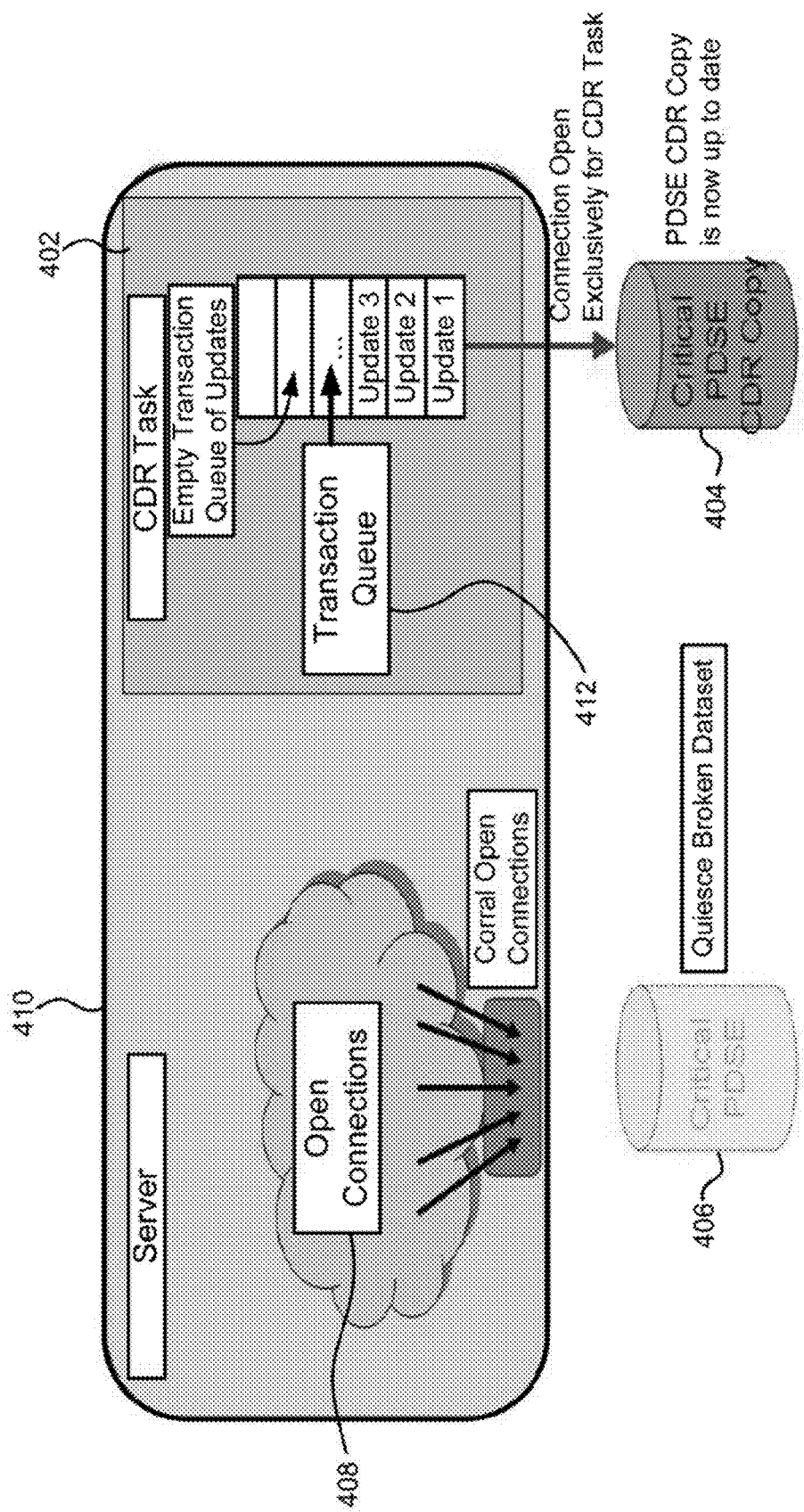
FIG. 4D shows an operation in protecting a CDR protected dataset, according to one embodiment.

As shown in FIG. 4D, the CDR then completes processing any outstanding updates on the transaction queue 412 to bring the protected copy 404 of the dataset up to the last known good logical state of the critical PDSE 406, e.g., a last known uncorrupted state of the critical PDSE 406, in one approach.

FIG. 4D shows the CDR flag or indicator being removed from the CDR copy dataset 404 making it a normal PDSE. The corralled connections 408 may then be redirected to the former CDR copy 404. The new critical PDSE 404 is now available for read and write with updates being pushed onto the transaction queue 412. As soon as the PDSE 404 is available for read, the PDSE 404 is immediately copied to create a new CDR copy dataset.

Figure 4E:
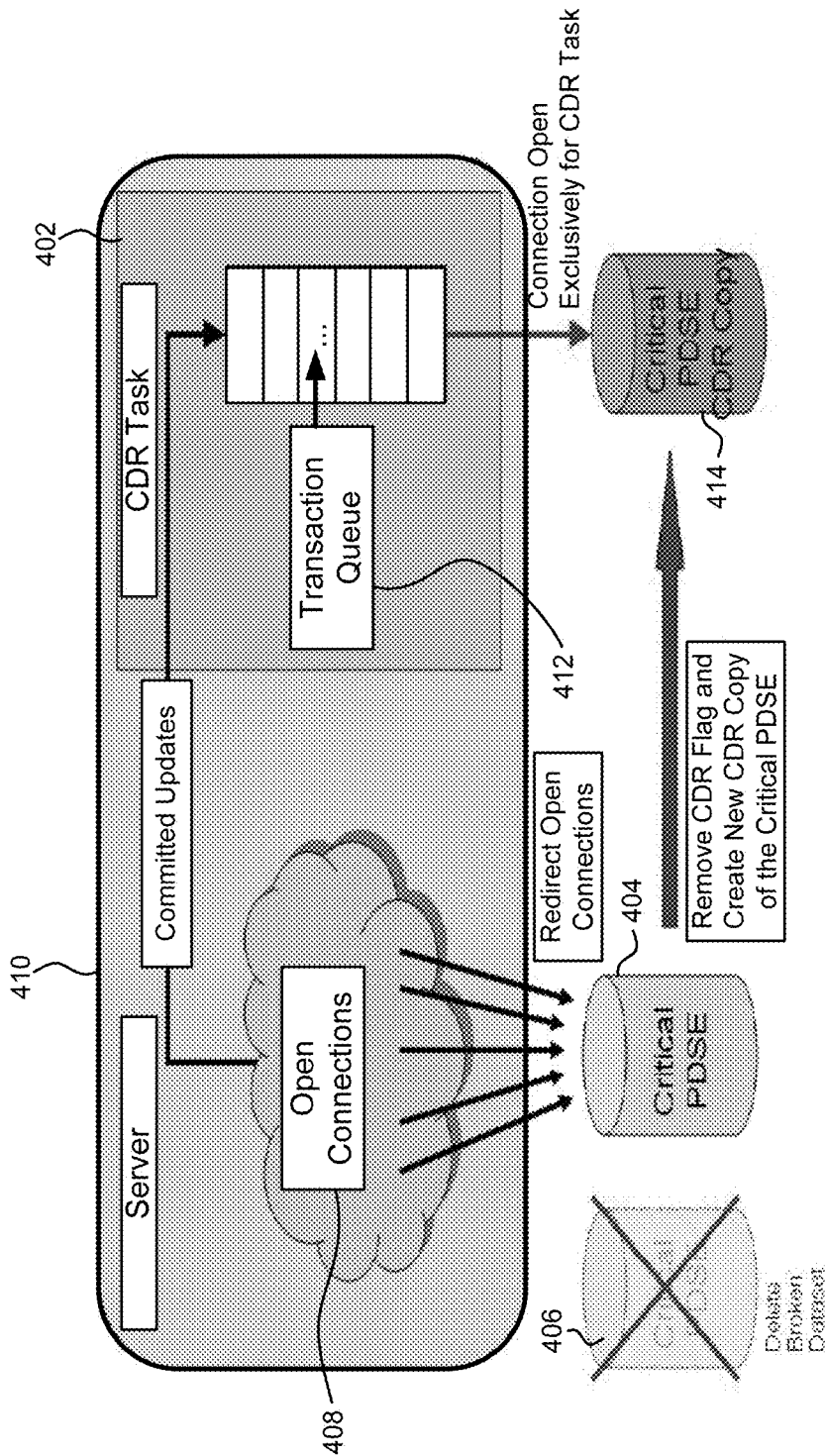
FIG. 4E shows an operation in protecting a CDR protected dataset, according to one embodiment.

Now referring to FIG. 4E, when the transaction queue 412 is empty, the CDR task 402 may release its exclusive lock on the protected copy 404 and all open connections 408 to the parent protected dataset 406 may then be redirected to the protected copy 404, in one approach. Then, a new protected copy 414 may be created and attached to the CDR task 402. The in-core index of the now-corrupt protected parent dataset 406 may be flushed according to the PDSE Least Recently Used (LRU) algorithm, thereby removing it from use. The now-corrupt protected parent dataset 406 may then be deleted. FIG. 4E shows the now-completed CDR copy 414 reconnected to the CDR task 402 and transaction queue 412. After this is performed, operation may return to normal, as shown in FIG. 4A, according to one approach.

Figure 5:
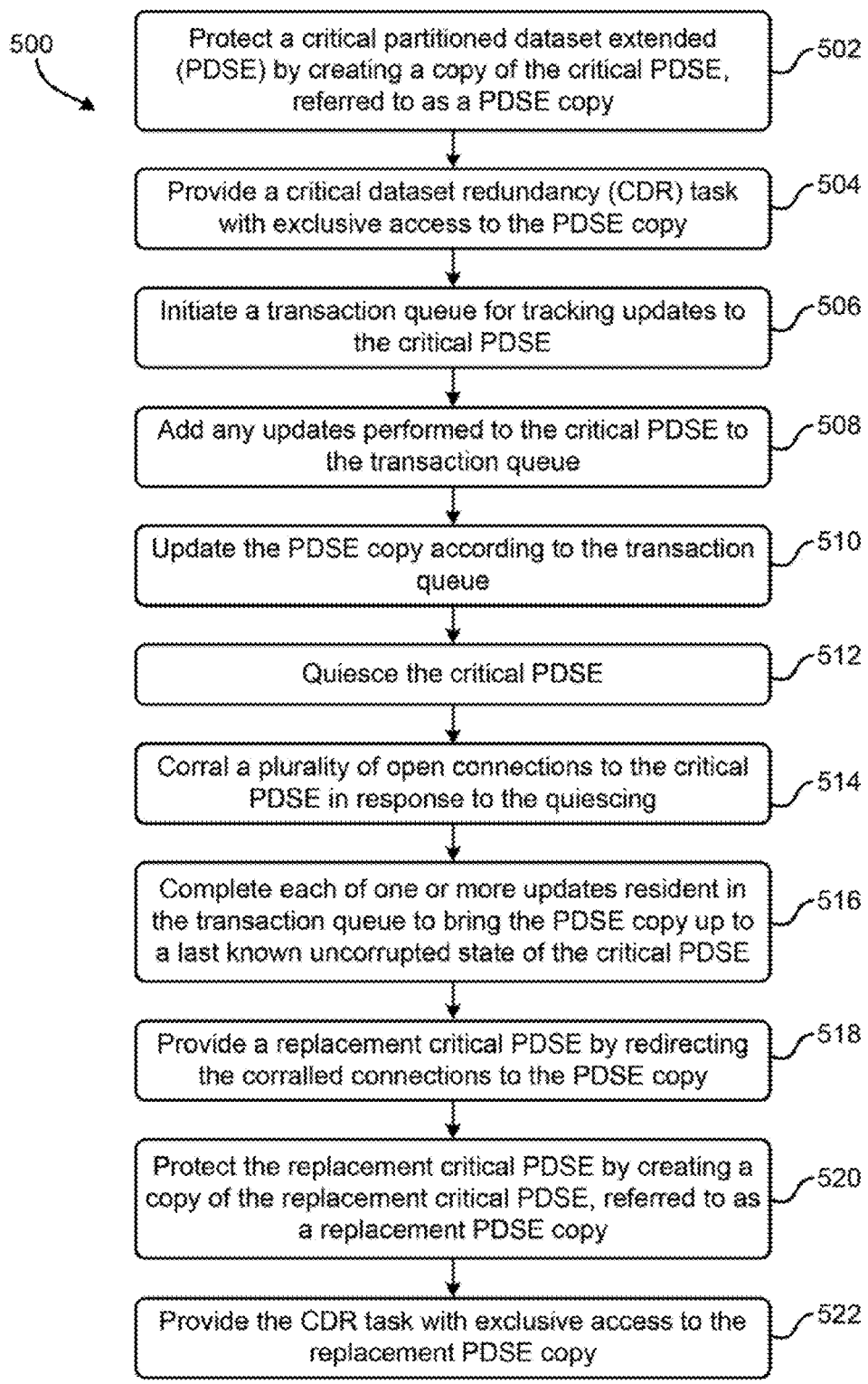
FIG. 5 shows a flowchart of a method, according to one embodiment.

Now referring to FIG. 5, a method 500 is shown according to one embodiment. The method 500 may be carried out in any desired environment, including those shown in FIGS. 1-4E, according to various embodiments. Of course, more or less operations than those shown in FIG. 5 may be included in method 500, according to various embodiments.

In operation 502, a critical PDSE is protected by creating a copy of the critical PDSE, referred to as a PDSE copy.

In one embodiment, the PDSE copy may be a logical equivalent of the critical PDSE. This is in contrast to an exact physical copy of the critical PDSE, as a logical copy may take up less space in memory, be more efficient to work with, etc.

In another approach, the PDSE copy may comprise a flag indicating that it is a dataset copy and is accessible only by the CDR task. The flag may simply be a bit that is flipped to indicate this state, or may be more involved and include additional data besides the copy flag, in more approaches.

In operation 504, a CDR task is provided with exclusive access to the PDSE copy.

In operation 506, a transaction queue is initiated for tracking updates to the critical PDSE. In one approach, the transaction queue may be a first-in first-out (FIFO) queue. Of course other types of queues may be used according to what a skilled artisan would understand.

In another embodiment, the transaction queue may be managed exclusively by the CDR task, or some other entity as would be understood by the skilled artisan upon reading the present descriptions.

In operation 508, any updates performed to the critical PDSE are added to the transaction queue. In another approach, only those updates deemed critical by the system or by the CDR task may be added to the transaction queue.

In operation 510, the PDSE copy is updated according to the transaction queue. The transaction queue may indicate an order for the updates to be performed, or may provide the updates according to some other rationale, such as size, importance or priority, etc.

In operation 512, the critical PDSE is quiesced. This may be performed in response to an event, a user instruction, a passage of an amount of time, or any other reason as would be understood by one of skill in the art upon reading the present descriptions.

In one embodiment, the quiescing the critical PDSE may occur at least in part due to detection of corruption in the critical PDSE due to an error. Any type of corruption may trigger the quiescing, including check bit errors, an ABEND error, a write error, a read error, etc. The error may relate to corruption of a PDSE directory for the critical PDSE either in memory of the system or on a DASD connected to the system, in some approaches. Of course, any other error may also cause corruption of the critical PDSE, and may be detected to cause the quiescing, according to various embodiments and as would be understood by one of skill in the art upon reading the present descriptions.

In operation 514, a plurality of open connections to the critical PDSE are corralled in response to the quiescing. If only one connection is open, then this one connection is corralled to be redirected to another dataset.

In operation 516, each of one or more updates resident in the transaction queue are completed to bring the PDSE copy up to a last known uncorrupted state of the critical PDSE.

In operation 518, a replacement critical PDSE is provided by redirecting the corralled connections to the PDSE copy.

In operation 520, the replacement critical PDSE is protected by creating a copy of the replacement critical PDSE, referred to as a replacement PDSE copy.

In operation 522, the CDR task is provided with exclusive access to the replacement PDSE copy.

In some further embodiments, the method 500 may include removing the flag from the PDSE copy (if it is set) after providing the replacement critical PDSE, and flagging the replacement PDSE copy to indicate that it is a dataset copy and is accessible only by the CDR task.

In another approach, a system may comprise a SMSPDSE server for managing the plurality of open connections to the critical PDSE, as would be understood by one of skill in the art upon reading the present descriptions.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Of course, any logic described herein may be implemented as a method on any device and/or system or as a computer program product, according to various embodiments.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system, comprising:
a critical partitioned dataset extended (PDSE) stored to memory of the system;
logic adapted for protecting the critical PDSE by creating a copy of the critical PDSE, referred to as a PDSE copy;
logic adapted for providing a critical dataset redundancy (CDR) task with exclusive access to the PDSE copy;
logic adapted for initiating a transaction queue for tracking updates to the critical PDSE;
logic adapted for adding any updates performed to the critical PDSE to the transaction queue;
logic adapted for updating the PDSE copy according to the transaction queue;
logic adapted for quiescing the critical PDSE;
logic adapted for corralling a plurality of open connections to the critical PDSE in response to the quiescing;
logic adapted for completing each of one or more updates resident in the transaction queue to bring the PDSE copy up to a last known uncorrupted state of the critical PDSE;
logic adapted for providing a replacement critical PDSE by redirecting the corralled connections to the PDSE copy;
logic adapted for protecting the replacement critical PDSE by creating a copy of the replacement critical PDSE, referred to as a replacement PDSE copy; and
logic adapted for providing the CDR task with exclusive access to the replacement PDSE copy.

2. The system as recited in claim 1, wherein the PDSE copy is a logical equivalent of the critical PDSE and comprises a flag indicating that it is a dataset copy and is accessible only by the CDR task.

3. The system as recited in claim 2, further comprising:
logic adapted for removing the flag from the PDSE copy after providing the replacement critical PDSE; and

13 logic adapted for flagging the replacement PDSE copy to indicate that it is a dataset copy and is accessible only by the CDR task.

4. The system as recited in claim 1, wherein the system comprises a SMSPDSE server for managing the plurality of open connections to the critical PDSE.

5. The system as recited in claim 1, wherein the transaction queue is first-in first-out (FIFO) and is managed exclusively by the CDR task.

6. The system as recited in claim 1, wherein the quiescing the critical PDSE occurs at least in part due to detection of corruption in the critical PDSE due to an error.

7. The system as recited in claim 6, wherein the error relates to corruption of a PDSE directory for the critical PDSE either in memory of the system or on a direct access storage device (DASD) connected to the system.

8. A computer program product for providing recoverability to a system, the computer program product comprising a computer readable storage medium having computer readable program code embodied therewith, the computer readable program code comprising:
 computer readable program code configured for protecting a critical partitioned dataset extended (PDSE) by creating a copy of the critical PDSE, referred to as a PDSE copy;
 computer readable program code configured for providing a critical dataset redundancy (CDR) task with exclusive access to the PDSE copy;
 computer readable program code configured for initiating a transaction queue for tracking updates to the critical PDSE;
 computer readable program code configured for adding any updates performed to the critical PDSE to the transaction queue;
 computer readable program code configured for updating the PDSE copy according to the transaction queue;
 computer readable program code configured for quiescing the critical PDSE;
 computer readable program code configured for corralling a plurality of open connections to the critical PDSE in response to the quiescing;
 computer readable program code configured for completing each of one or more updates resident in the transaction queue to bring the PDSE copy up to a last known uncorrupted state of the critical PDSE;
 computer readable program code configured for providing a replacement critical PDSE by redirecting the corralled connections to the PDSE copy;
 computer readable program code configured for protecting the replacement critical PDSE by creating a copy of the replacement critical PDSE, referred to as a replacement PDSE copy; and
 computer readable program code configured for providing the CDR task with exclusive access to the replacement PDSE copy.

9. The computer program product as recited in claim 8, wherein the PDSE copy is a logical equivalent of the critical PDSE and comprises a flag indicating that it is a dataset copy and is accessible only by the CDR task.

10. The computer program product as recited in claim 9, further comprising:
 computer readable program code configured for removing the flag from the PDSE copy after providing the replacement critical PDSE; and
 computer readable program code configured for flagging the replacement PDSE copy to indicate that it is a dataset copy and is accessible only by the CDR task.

14

11. The computer program product as recited in claim 8, wherein the system comprises a SMSPDSE server for managing the plurality of open connections to the critical PDSE.

12. The computer program product as recited in claim 8, wherein the transaction queue is first-in first-out (FIFO) and is managed exclusively by the CDR task.

13. The computer program product as recited in claim 8, wherein the quiescing the critical PDSE occurs at least in part due to detection of corruption in the critical PDSE due to an error.

14. The computer program product as recited in claim 8, wherein the error relates to corruption of a PDSE directory for the critical PDSE either in memory of the system or on a direct access storage device (DASD) connected to the system.

15. A computer program product for providing recoverability to a system, the computer program product comprising a computer readable storage medium having computer readable program code embodied therewith, the computer readable program code comprising:
 computer readable program code configured for protecting a critical partitioned dataset extended (PDSE) by creating a copy of the critical PDSE, referred to as a PDSE copy, wherein the PDSE copy is a logical equivalent of the critical PDSE;
 computer readable program code configured for providing a critical dataset redundancy (CDR) task with exclusive access to the PDSE copy;
 computer readable program code configured for flagging the PDSE copy to indicate that it is a dataset copy and is accessible only by the CDR task;
 computer readable program code configured for initiating a transaction queue for tracking updates to the critical PDSE:
 computer readable program code configured for adding any updates performed to the critical PDSE to the transaction queue;
 computer readable program code configured for updating the PDSE copy according to the transaction queue;
 computer readable program code configured for quiescing the critical PDSE;
 computer readable program code configured for corralling a plurality of open connections to the critical PDSE in response to the quiescing,
 computer readable program code configured for completing each of one or more updates resident in the transaction queue to bring the PDSE copy up to a last known uncorrupted state of the critical PDSE;
 computer readable program code configured for providing a replacement critical PDSE by redirecting the corralled connections to the PDSE copy;
 computer readable program code configured for removing the flag from the PDSE copy after providing the replacement critical PDSE;
 computer readable program code configured for protecting the replacement critical PDSE by creating a copy of the replacement critical PDSE, referred to as a replacement PDSE copy;
 computer readable program code configured for providing the CDR task with exclusive access to the replacement PDSE copy; and
 computer readable program code configured for flagging the replacement PDSE copy to indicate that it is a dataset copy and is accessible only by the CDR task.

* * * * *